US006845289B2

(12) United States Patent
Salewski et al.

(10) Patent No.: US 6,845,289 B2
(45) Date of Patent: Jan. 18, 2005

(54) HYBRID MODEL AND METHOD FOR DETERMINING MANUFACTURING PROPERTIES OF AN INJECTION-MOLDED PART

(75) Inventors: Klaus Salewski, Krefeld (DE); Thomas Mrziglod, Gladbach (DE); Martin Wanders, Odenthal (DE); Roland Loosen, Erftstadt (DE); Jürgen Flecke, Dormagen (DE); Bahman Sarabi, Krefeld (DE)

(73) Assignee: Bayer Aktiengesellschaft, Leverkusen (DE)

(*) Notice: Subject to any disclaimer, the term of this patent is extended or adjusted under 35 U.S.C. 154(b) by 199 days.

(21) Appl. No.: 10/127,367

(22) Filed: Apr. 22, 2002

(65) Prior Publication Data

US 2003/0014152 A1 Jan. 16, 2003

(30) Foreign Application Priority Data

Apr. 25, 2001 (DE) .......................... 101 20 476

(51) Int. Cl.⁷ .......................... G05B 13/02; B29C 45/00
(52) U.S. Cl. .......................... 700/200; 700/29; 700/48; 706/23; 706/904
(58) Field of Search ................................ 700/200, 201, 700/48, 108, 202–205, 109, 28, 129; 706/912, 904, 21, 23, 25, 31; 703/2

(56) References Cited

U.S. PATENT DOCUMENTS

| 5,434,783 A | 7/1995 | Pal et al. ............... 384/424.05 |
| 5,671,335 A | * 9/1997 | Davis et al. ................... 706/25 |
| 5,673,368 A | 9/1997 | Broese et al. ................. 395/22 |
| 5,796,920 A | 8/1998 | Hyland ......................... 395/22 |
| 5,914,884 A | 6/1999 | Gur Ali et al. ......... 364/475.05 |
| 6,047,221 A | 4/2000 | Piche et al. .................... 700/44 |
| 6,600,961 B2 | * 7/2003 | Liang et al. .................. 700/48 |
| 2001/0051858 A1 | * 12/2001 | Liang et al. .................... 703/2 |

FOREIGN PATENT DOCUMENTS

| DE | 195 14 535 | 10/1996 |
| DE | 197 43 600 | 4/1999 |

OTHER PUBLICATIONS

Yarlagadda, P K D V "Prediction of processing parameters for injection moulding by using a hybrid neural network" Proc. of th Institution of Mechanical Engineers Part B Engineering Manufacture Oct. 16, 2001 vol. 215 Issue 10 pp. 1465–1470.*

(List continued on next page.)

Primary Examiner—Leo Picard
Assistant Examiner—Steven R. Garland
(74) Attorney, Agent, or Firm—Joseph C. Gil; James R. Franks

(57) ABSTRACT

A method of determining properties relating to the manufacture of an injection-molded article is described. The method makes use of a hybrid model which includes at least one neural network and at least one rigorous model. In order to forecast (or predict) properties relating to the manufacture of a plastic molded part, a hybrid model is used which includes: one or more neural networks $NN1, NN2, NN3, NN4, \ldots, NN_k$; and one or more rigorous models $R1, R2, R3, R4, \ldots$, which are connected to one another. The rigorous models are used to map model elements which can be described in mathematical formulae. The neural model elements are used to map processes whose relationship is present only in the form of data, as it is typically impossible to model such processes rigorously. As a result, a forecast (or prediction) relating to properties including, for example, the mechanical, thermal and rheological processing properties and relating to the cycle time of a plastic molded part can be made.

18 Claims, 3 Drawing Sheets

OTHER PUBLICATIONS

Neural Networks, vol. 5, (month unavailable) 1992, pp. 139–144, Frank Bärmann and Friedrich Biegler–König, On a Class of Efficient Learning Algorithms for Neural Networks.

Psichogios D C et al: "Process Modeling Using Structured Neural Networks" Proceeding Of The American Control Conference (ACC). Chicago, Jun. 24–26, 1992, New York, IEEE, US, Bd. 3, Jun. 6, 1992, Seiten 1917–1921, XP000343627, ISBN: 0–7803–0210–9 *Seite 1918, linke Spalte, Zeile 19—rechte Spalte, Zeile 28.

Smith J et al: "An artificial nerual network model of certain aspects of fighter pilot cognition" Decision Aiding for Complex Systems. Charlottesville, VA., Oct. 13–16, 1991, Proceeding of the International Conference on Systems, Man And Cybernetics, New York, IEEE, US, Bd. 1_, Oct. 13, 1991, Seten 1545–1550, XP010054640 ISBN: 0–7803–0233–8 Seite 1546, rechte Spalte, Zeile 11—Zeile 32.

* cited by examiner

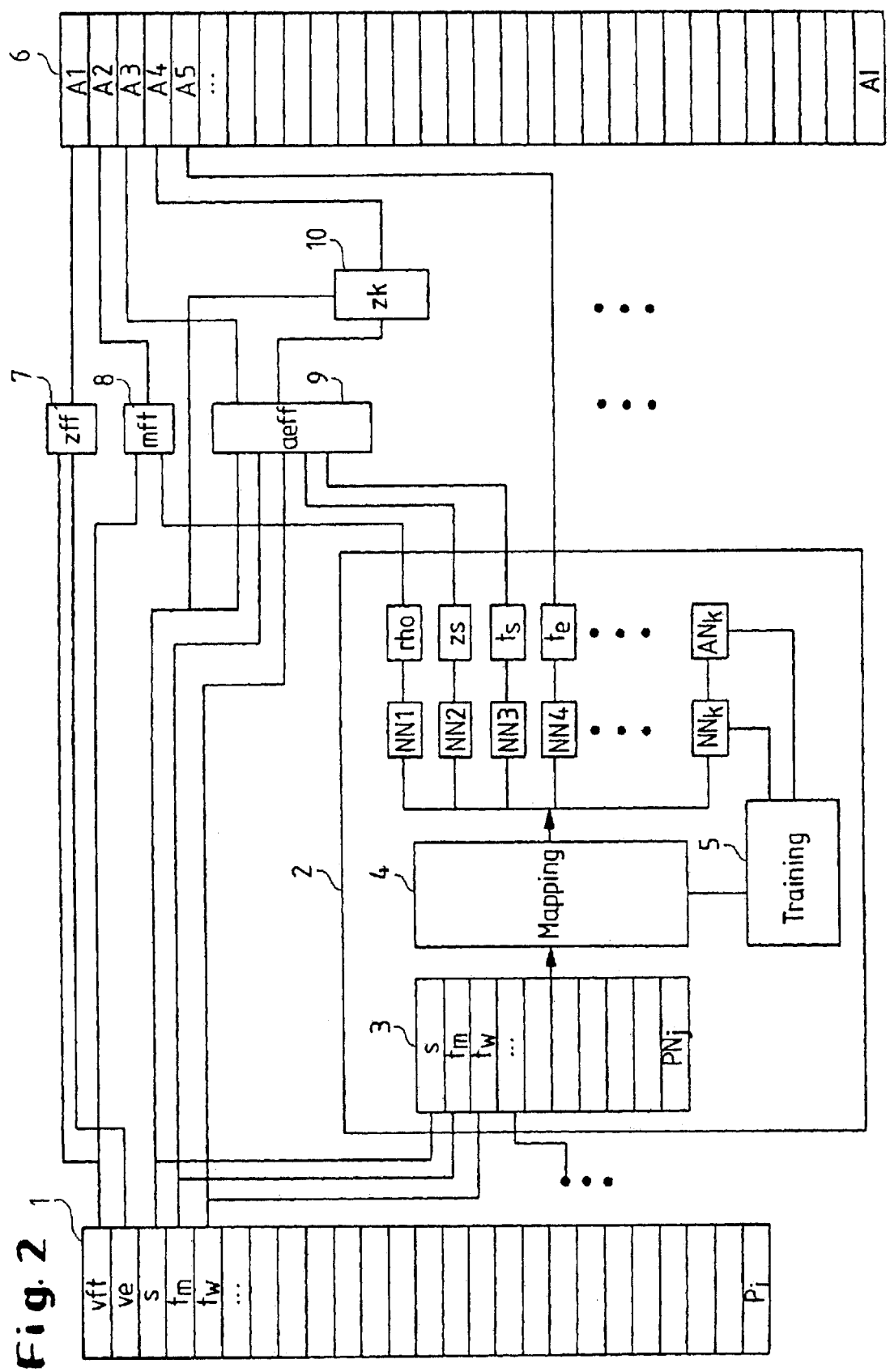

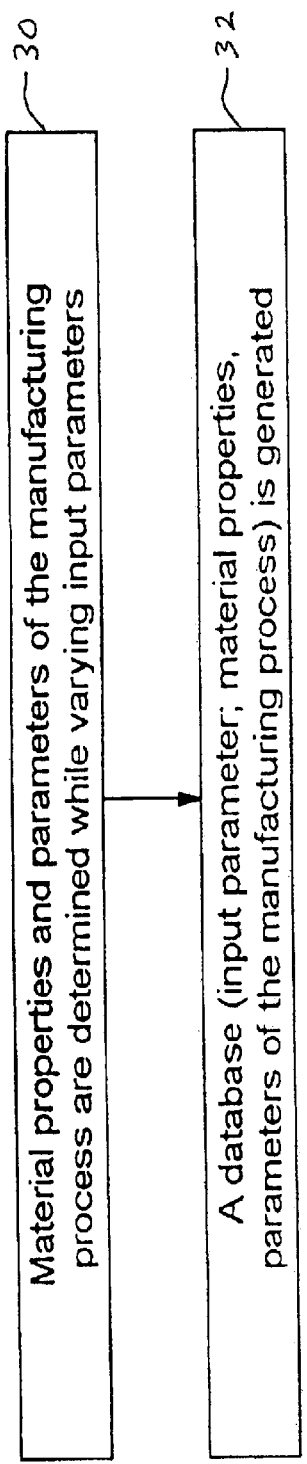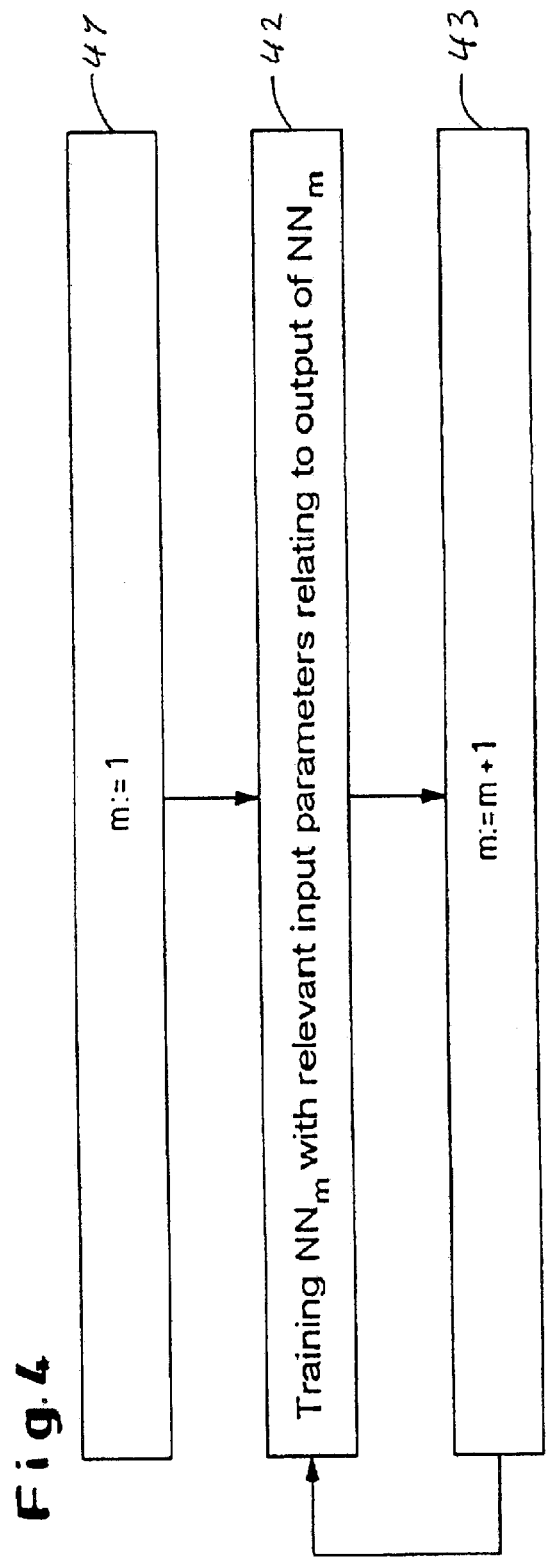

HYBRID MODEL AND METHOD FOR DETERMINING MANUFACTURING PROPERTIES OF AN INJECTION-MOLDED PART

CROSS REFERENCE TO RELATED PATENT APPLICATION

The present patent application claims the right of priority under 35 U.S.C. §119 (a)-(d) of German Patent Application No. 101 20 476.0, filed Apr. 25, 2001.

FIELD OF THE INVENTION

The invention relates to a method of determining properties relating to the manufacture of an injection-molded article. The method includes the use of a hybrid model, which includes at least one neural network and at least one rigorous model.

BACKGROUND OF THE INVENTION

U.S. Pat. No. 5,914,884 discloses a method for evaluating the properties of a plastic material in a plastic injection-molding method. An empirical model is used to describe the relationship between process variables and a multiplicity of quality characteristics. The empirical model is produced with reference to empirical data determined by means of a plastic injection-molding process. One of the disadvantages of this method is the practical difficulties and the necessary expenditure involved in the generation of the empirical model.

SUMMARY OF THE INVENTION

The invention is therefore based on the object of providing an improved method, with a neural network, for determining a manufacturing property of an injection-molded part.

In accordance with the present invention, there is provided a method of determining properties relating to the manufacture of an injection-molded part comprising:

(a) providing a hybrid model comprising,
  (i) a first input (1) for inputting parameters,
  (ii) at least one neural network (NN1, . . . $NN_k$) for inputting at least one of said parameters into the neural network, and having a first output for outputting a forecast value, and
  (iii) at least one rigorous model (R1, R2, R3; R4, R5, . . . ) having a second input for inputting at least one of said parameters and said forecast value, and a second output for outputting a calculated value relating to the properties,
(b) selecting said parameters;
(c) inputting said parameters into said hybrid model; and
(d) obtaining at least one of said forecast value and said calculated value relating to at least one of said properties.

The features that characterize the present invention are pointed out with particularity in the claims, which are annexed to and form a part of this disclosure. These and other features of the invention, its operating advantages and the specific objects obtained by its use will be more fully understood from the following detailed description and the accompanying drawings in which preferred embodiments of the invention are illustrated and described.

Other than in the examples, or where otherwise indicated, all numbers or expressions, such a those expressing structural dimensions, etc., used in the specification and claims are to be under stood as modified in all instances by the term "about."

BRIEF DESCRIPTION OF THE DRAWING FIGURES

FIG. 2 is a representative schematic illustration of an application of the hybrid model of FIG. 1;

FIG. 3 is a representative flow chart of the steps for generating a database for training the neural network of the hybrid model used in the method of the present invention; and FIG. 4 is a representative flow chart of the steps involved in training of the neural networks of the hybrid model used in the method of the present invention.

In FIGS. 1–4, like reference numerals designate the same components and structural features.

DETAILED DESCRIPTION OF THE INVENTION

Figure 1:
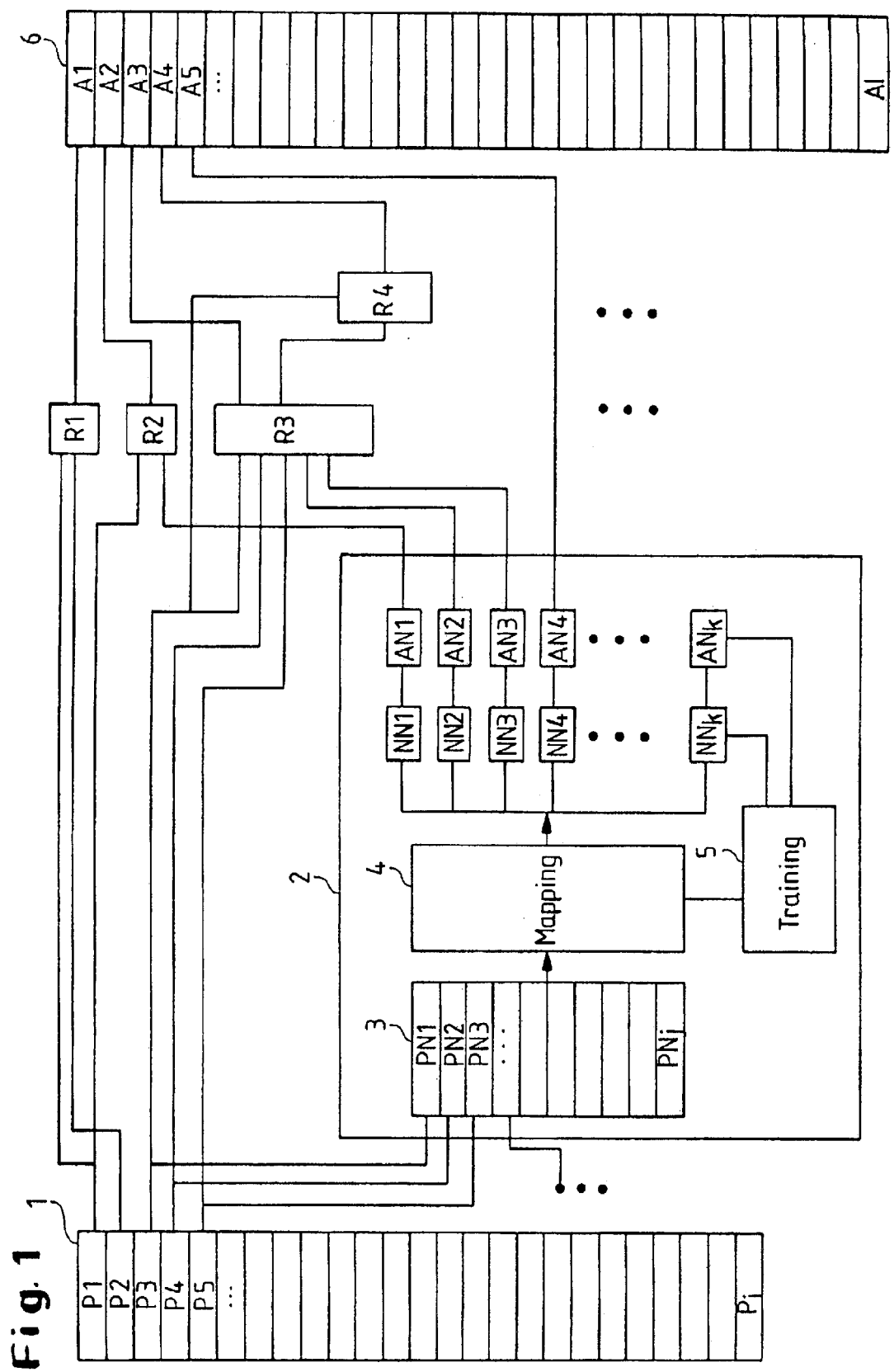
FIG. 1 is a representative schematic illustration of an embodiment of the hybrid model used in the method of the present invention.

The invention permits various properties relating to the manufacture of an injection-molded part to be forecast (or predicted), specifically both with respect to the injection-molding method and with respect to the properties of the resulting injection-molded part.

In particular, the forecasting of process times and processing properties during injection-molding of plastic molded parts is of great practical significance because the manufacturing costs of injection-molded parts are decisively influenced by the productivity of the injection-molding fabrication. The characteristic parameter here is the process time of the injection-molding machine for manufacturing a molded part.

To calculate the process time requires not only the material-specific properties to be characterized by the raw material manufacturer but also the customer-specific application (geometry, mold) to be taken into account. The corresponding process times thus result from the interaction of material properties, the process parameters of the injection-molding machine and the construction of the injection mold.

These complex relationships can be mapped using neural networks. The neural networks are supplemented by rigorous computational models which are connected to the neural network. For example, in such a rigorous computational model it is possible to calculate the plastification capacity taking into account the screw geometry of the injection-molding machine used.

The comprehensive modelling of the injection-molding process permits, over and beyond the forecasting of a process time, a large amount of information to be obtained on important quality features of the injection-molded part. By taking into account the process control, it is possible, for example, to forecast the dimensional accuracy of the molded parts, the modules of elasticity, the fracture stresses and elongations as a function of the direction of flow and wall thickness, the resistance to demolding under heat and further material properties.

A further advantage of the invention is that these forecasts relating to the injection-molding process and/or the expected properties of the molded parts can be carried out by the user without special knowledge. It is a particular advantage here that the invention can be used for planning and designing new injection-molding applications. The hybrid neural network according to the invention makes it possible to test the feasibility of a new project, even in an extremely early planning phase, by means of a computer simulation which is easy to carry out. This is in particular of great significance for the reduction of what is referred to as the "time to market" phase.

Furthermore, the invention for computationally configuring parts permits the design engineer to make available suitable material characteristic values by forecasting using the hybrid model according to the invention. Owing to a complex material characteristic of plastics, such material characteristic values may be indispensable for a reliable configuration of parts. The invention makes it possible to determine such material characteristic values without carrying out test series or the like.

In addition, the invention also makes possible a forecast with respect to the machine and process parameters of the plastic injection-molding machine which are necessary for a desired molded part. It is thus possible to test in advance whether it is at all possible to manufacture a specific part on an existing injection-molding machine.

An embodiment of the invention will be explained in more detail below with reference to the drawings.

The hybrid neural network in FIG. 1 has an input 1 for inputting parameters P1, P2, P3 . . . $P_i$. These parameters can be material parameters or recipe (or formulation) parameters, for example for specifying composite recipes made up of commercial products, and/or process and machine parameters relating to the injection-molding process or the injection-molding machine, and/or design parameters and molded-part parameters, for example relating to the wall thickness of the molded part and of the flow length.

In the embodiment under consideration here, the input 1 is used to input, inter alia, the following parameters:

| Molded part parameters | Recipe | Process parameters | Machine parameters |
|---|---|---|---|
| Test specimen thickness, Molded part volumes, Customer-specific filling length | Pocan, fibre glass, macrolon, citric acid, paraloid, talcum | Stock temperature, mold temperature, holding pressure | Shear rate, injection rate, screw diameter, pitch of metering zone, flight depth of the screw of the metering zone, channel width of the metering zone, length of the metering zone, back pressure, speed of screws |

In addition, the hybrid model has a neural network module 2. The neural network module 2 has an input 3 for inputting parameters PN1, PN2, PN3 . . . $PN_j$. The input 3 is connected to the input 1 so that some of the parameters P1 to $P_i$ of the input 1 are also entered into the input 3 of the neural network module 2.

By virtue of a corresponding connection between the input 3 and the input 1, the input parameter PN1 of the neural network module 2 is therefore identical to the parameter P3 of the input 1 of the hybrid model. The parameters PN2 and P4, and PN3 and P5, are also identical in the example shown.

The parameters PN1 to $PN_j$ therefore form a subset of the parameters P1 to $P_i$. The further corresponding connections between the input 1 and the input 3 are not shown in detail in FIG. 1 for the sake of clarity.

The input 3 of the neural network module 2 is connected to a mapping module 4. The mapping module 4 is itself connected to the neural networks NN1, NN2, NN3, NN4, . . . $NN_k$. Each of the neural networks NN1 to $NN_k$ has a corresponding output AN1 to $AN_k$.

Each of the neural networks NN1 to $NN_k$ is trained for forecasting a specific property which is output via the corresponding output if the necessary input parameters are applied to the input of the respective neural network. The number of necessary input parameters may vary here.

In order to apply the input parameters necessary for a specific neural network to the input of this network, the mapping module 4 carries out corresponding transformations of the parameter vector of input 3 which is composed of the parameters PN1 to $PN_j$. If, for example, the neural network NN1 requires only the input parameters PN1, PN2 and PN3, but not the further parameters PN4 to $PN_j$, the mapping module 4 ensures that only the parameters PN1 to PN3 are present at the input of the neural network NN1. The same applies to the further neural networks. The mapping can be carried out by multiplying the parameter vector of the input 3 in each case by a specific matrix adapted to the respective neural network.

The neural network module 2 also has a training module 5 which is active in a training mode of the neural network module 2. The training module 5 is respectively connected to the mapping module 4 and to the neural networks NN1 to $NN_k$ as well as to their corresponding outputs. The training of the individual neural networks can be carried out sequentially here, that is to say the individual neural networks are trained in a known fashion independently of one another by applying different input parameters under the supervision of the training module 5.

What is referred to as the back-propagation method or the "NN-Tool 2000" program, for example, which is commercially available from Professor Frank Bärmann, Fachhochschule Gelsenkirchen, Fachbereich physikalische Technik [Technical University of Gelsenkirchen, Department of Physical Technology] is suitable for this purpose. The corresponding training method is also described in the publication "Neural Network", volume 5, pages 139 to 144, 1992, "On a class of efficient learning algorithms for neural networks", Frank Bärmann, Friedrich Biegler-König.

The hybrid neural network also has a number of rigorous models R1, R2, R3, R4, . . . . The rigorous models are model elements which can be represented by means of mathematical formulae. Those parts of the model for which mathematical formulae cannot be specified are dealt with by means of the neural network module 2. The rigorous models can be connected to one another and to the neural network module.

In the embodiment shown, the rigorous model R1 is connected only to the input 1, but not to other rigorous models or to an output of the neural network module 2. The output of the rigorous model R1 is connected to the output A1 of the output 6.

The rigorous model R2 is, on the other hand, connected to the parameter P1 of the input 1 and to the output AN1 of the neural network module 2. The output of the rigorous model R2 is connected to the output A2.

The rigorous model R3 is connected to the parameters P3, P4 and P5 of the input 1 and to the outputs AN2 and AN3 of the neural network module 2. The output of the rigorous model R3 is connected both to the output A3 and to the input of the rigorous model R4. The rigorous model R4 has a further input which is connected to the parameter P3. The output of the rigorous model R4 is connected to the output A4.

In the embodiment discussed herein, the parameters PN1 to $PN_j$ of the input 3 can be independently selected from recipe, thickness, stock temperature, mold temperature, shear rate and holding pressure.

The output variables which are present at the outputs AN1 to $AN_k$ can correspondingly be the density, sealing period, sealing temperature, demolding temperature, standard filling pressure, zero viscosity, reciprocal transitional shear rate, Carreau increase and mechanical properties.

The mass of the molded part, the mold-filling time, the effective thermal conductivity, the cooling time, the filling pressure, the metering time, the process time and further mechanical properties, for example, can then be determined computationally using the rigorous models.

The following values are then correspondingly available at the output 6, for example:

| Processing properties | Mechanical properties | Thermal properties | Forecast of cycle time | Rheological properties |
|---|---|---|---|---|
| Filling pressure, Plastifying capacity, static friction, sliding friction, shrinkage | Modulus of elasticity (longitudinal, transverse), yield stress, yield elongation, tearing stress (longitudinal, transverse), breaking strain (longitudinal, transverse), work to yield stress, work to breakage, nominal breaking strain, bending modulus, bending stress, peripheral fibre strain, resistance to breaking | Demolding temperature, density, non-flow temperature, mass of molded part | Sealing period, cycle time, mold-filling time (injection time), metering time, cooling time | Melt viscosity, Carreau parameters, Carreau melt viscosity |

FIG. 2 shows an application case of the hybrid neural network in FIG. 1. The following parameters P1 to P5 are shown by way of example at the input 1:
vft=volume of molded part
ve=injection speed
s=thickness
$t_m$=mass, temperature
$t_w$=mold temperature The further input parameters of the input 1 are not illustrated in FIG. 2 for the sake of simplicity.

The parameters vft and ve are input into the rigorous model 7 in order to calculate the mold-filling time. For this purpose, the following formula:

$$zff = \left(\frac{vft}{0.85}\right) \cdot \frac{4}{(ve \cdot s^2 \cdot \pi)}$$

is stored in the rigorous model 7. The mold-filling time zff calculated with the rigorous model 7 is output via the output A1.

The following formula:

$$mft = vft \cdot rho$$

is stored in the rigorous model 8 in order to calculate the mass mft of the molded part.

Correspondingly, the inputs of the rigorous model 8 are combined with the parameter vft of the input 1 or with the output of the neural network NN1. The output of the neural network NN1 supplies the density rho. The rigorous model 8 then calculates the mass mft of the molded part from the input parameter vft or the forecast value rho, and the mass mft of the molded part is then output via the output A2.

The rigorous model 9 is used to calculate the effective thermal conductivity aeff. In order to calculate the effective thermal conductivity, the following formula:

$$aeff = \frac{s^2}{\pi^2 \cdot zs} \cdot \log\left(\frac{4}{\pi} \cdot \frac{t_m - t_w}{t_s - t_w}\right)$$

is stored in the rigorous model 9.

The input of the rigorous model 9 is correspondingly connected to the corresponding parameters s, $t_m$ and $t_w$ of the input 1. In addition, the input of the rigorous model 9 is also connected to the outputs of the neural networks NN2 and NN3 which supply the sealing period zs and the sealing temperature $t_s$ as forecast values. The effective thermal conductivity aeff which is determined in this way is output via the output A3 of the rigorous model 9.

In addition, the effective thermal conductivity aeff is also fed from the output of the rigorous model 9 to an input of the rigorous model 10. The rigorous model 10 is used to calculate the cooling time zk. The following formula:

$$zk = \frac{s^2}{\pi^2 \cdot aeff} \cdot \log\left(\frac{4}{\pi} \cdot \frac{t_m - t_w}{t_e - t_w}\right)$$

is stored in the rigorous model 10 in order to calculate the cooling time.

The rigorous model 10 correspondingly has a further input which is connected to the parameter s of the input 1, and further inputs which are not shown in FIG. 2 for the sake of clarity and which are connected to the input parameters $t_m$ and $t_w$ and to the forecast value $t_e$ of the output of the neural network NN4. The cooling time zk which is determined on the basis of this input parameter and/or on the basis of the forecast value and the effective thermal conductivity is output by the rigorous model 10 via the output A4.

The hybrid neural model can contain further rigorous models, for example for calculating the filling pressure for the customer's application, the calculation of the metering time, the processing time and the transformation of specific mechanical properties. These further rigorous model elements are not illustrated in FIG. 2 for the sake of clarity. Corresponding calculation specifications for implementing such further rigorous model elements can be found, for example, in the publications Anwendungstechnische Information [Technical Application Information] 1104, "optimierte Werkzeugtemperierung [Optimized Mold Temperature Control]", Olaf Zöllner, Bayer AG, Geschäftsbereich Kunststoffe [Plastics Division].

FIG. 3 shows the sequence for the generation of a database, for training the neural networks of the hybrid model. Firstly, in step 30, a series of tests is carried out during which respective plastic molded parts are manufactured while varying, for example, recipes and injection molds (thickness) and varying processing parameters and machine parameters of the plastic injection-molding machine, said molded parts then being subjected to analysis. In step 32, a database is generated from the data determined in step 30. This database includes the input parameters for each data record, that is to say the respective recipe parameters and mold parameters as well as the processing parameters and machine parameters and the corresponding resulting properties of the manufactured plastic molded part, in particular its mechanical properties as well as the characteristics of the manufacturing process, that is to say the processing properties, thermal properties, rheological properties and the processing time.

FIG. 4 shows the procedure for training the individual neural networks of the hybrid model. In step 41, the serial variable m is firstly initialized with the value 1.

In step 42, the first neural network NN1 is trained. To do this, the database is accessed in order to call the input parameters necessary for training the respective neural network NN1. The output of the neural network NN1—the density in the example in FIG. 2—is compared with the value determined in the experiment. Given a difference between the forecast value and the actual value, the weightings of the neurons of the neural network NN1 are correspondingly adapted, as is known per se. After the training of the neural network NN1 has been terminated in step 42, the serial variable m is incremented in step 43, and step 42 is repeated until all the neural networks $NN_m$ have been trained.

List of reference numbers used in the drawing figures:

| | |
|---|---|
| Input | 1 |
| Neural network | 2 |
| Input | 3 |
| Mapping module | 4 |
| Training module | 5 |
| Output | 6 |
| Rigorous model | 7 |
| Rigorous model | 8 |
| Rigorous model | 9 |
| Rigorous model | 10 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method of determining properties relating to the manufacture of an injection-molded part comprising:
    (a) providing a hybrid model comprising,
        (i) a first input (1) for inputting parameters,
        (ii) at least one neural network ($NN1, \ldots NN_k$) having an input for inputting at least one of said parameters into the neural network, and having a first output for outputting a forecast value,
        (iii) at least one rigorous model (R1, R2, R3; R4, R5, ...) having a second input for inputting at least one of said parameters and said forecast value, and a second output for outputting a calculated value relating to the properties,
        (iv) a means for mapping an input vector of parameters (P1, P2, P3, P4, P5 ... $P_j$) onto a subvector (PN1, PN2, PN3 .... $PN_j$), and
        (v) a means (4) for mapping the subvector onto corresponding inputs of the neural networks;
    (b) selecting said parameters;
    (c) inputting said parameters into said hybrid model; and
    (d) obtaining at least one of said forecast value and said calculated value relating to at least one of said properties.

2. The method of claim 1 wherein said hybrid model comprises a multiplicity of neural networks ($NN1, \ldots NN_k$) for outputting a corresponding multiplicity of forecast values.

3. The method of claim 1 wherein the parameters input into each neural network are selected independently from at least one of molded-part parameters, recipe parameters, process parameters and machine parameters.

4. The method of claim 1 wherein said forecast value relates to at least one of the following properties: rheological properties, processing properties, mechanical properties, thermal properties, and processing time.

5. The method of claim 1 wherein the output of each rigorous model relates independently to at least one of the following properties: rheological properties, processing properties, mechanical properties, thermal properties, and processing time.

6. The method of claim 1 wherein each neural network independently outputs at least one of the following forecast values: melt viscosity, Carreau parameters, filling pressure, plastifying capacity, modulus of elasticity, yield stress, yield elongation, tearing stress, breaking strain, work to yield stress, work to breakage, nominal breaking strain, static friction, sliding friction, shrinkage, demolding temperature, bending modulus, bending stress, peripheral fiber strain, resistance to breaking, density, sealing temperature, and molded part mass.

7. The method of claim 1 wherein each rigorous model independently outputs at least one calculated value relating to at least one of the following properties: cycle time, mold-filling time, injection time, metering time, cooling time, customer-specific filling pressure, Carreau melt viscosity, effective thermal conductivity, modulus of transverse elasticity, transverse tearing stress, and transverse breaking strain.

8. The method of claim 1 wherein said hybrid model further comprises a rigorous model for calculating a mold-filling time from a volume of the molded part and a speed of injecting thermoplastic material into mold.

9. The method of claim 1 wherein said hybrid model further comprises a rigorous model for calculating the mass of the molded part from a volume of the molded part and a density of the molded part.

10. The method of claim 1 wherein said hybrid model further comprises a rigorous model for calculating an effective thermal conductivity from a thickness of the injection-molded part, and a sealing time, a mass temperature, a mold temperature and a sealing temperature of a molding process by which said injection-molded part is prepared.

11. The method of claim 1 wherein said hybrid model comprises a rigorous model for calculating a cooling time of the manufacturing process by which said molded part is prepared, said cooling time being calculated from at least one process parameter selected from: the effective thermal conductivity and the thickness of said molded part; and a mass temperature, a mold temperature and a demolding temperature of the manufacturing process by which said molded part is prepared.

12. The method of claim 1 wherein said hybrid model comprises a second rigorous model, one input of the second rigorous model being connected to at least one output of another rigorous model in order to input the calculated value.

13. A method of determining properties relating o the manufacture of an injection-molded part comprising:

(a) providing a hybrid model comprising,
  (i) a first input (1) for inputting parameters,
  (ii) at least one neural network (NN1, ... NN$_k$) having an input for inputting at least one of said parameters into the neural network, and having a first output for outputting a forecast value, and
  (iii) at least one rigorous model (R1, R2, R3; R4, R5, ...) having a second input for inputting at least one of said parameters and said forecast value, and a second output for outputting a calculated value relating to the properties, (b) selecting said parameters;

(c) inputting said parameters into said hybrid model; and (d) obtaining at least one of said forecast value and said calculated value relating to at least one of said properties wherein each rigorous model independently outputs at least one calculated value relating to at least one of the following properties: cycle time, mold-filling time, injection time, metering time, cooling time, customer-specific filling pressure, Carreau melt viscosity, effective thermal conductivity, modulus of transverse elasticity, transverse tearing stress, and transverse breaking strain.

14. The method of claim 13 wherein said hybrid model further comprises a rigorous model for calculating a mold-filling time from a volume of the molded part and a speed of injecting thermoplastic material into a mold.

15. The method of claim 13 wherein said hybrid model further comprises a rigorous model for calculating the mass of the molded part from a volume of the molded part and a density of the molded part.

16. The method of claim 13 wherein said hybrid model further comprises a rigorous model for calculating an effective thermal conductivity from a thickness of the injection-molded part, and a sealing time, a mass temperature, a mold temperature and a sealing temperature of a molding process by which said injection-molded part is prepared.

17. The method of claim 13 wherein said hybrid model comprises a rigorous model for calculating a cooling time of the manufacturing process by which said molded part is prepared, said cooling time being calculated from at least one process parameter selected from: the effective thermal conductivity and the thickness of said molded part; and a mass temperature, a mold temperature and a demolding temperature of the manufacturing process by which said molded part is prepared.

18. The method of claim 13 wherein said hybrid model comprises a second rigorous model, one input of the second rigorous model being connected to at least one output of another rigorous model in order to input the calculated value.

* * * * *

UNITED STATES PATENT AND TRADEMARK OFFICE
CERTIFICATE OF CORRECTION

PATENT NO. : 6,845,289 B2
DATED : January 18, 2005
INVENTOR(S) : Klaus Salewski et al.

It is certified that error appears in the above-identified patent and that said Letters Patent is hereby corrected as shown below:

Column 7,
Lines 58-60, delete paragraph (iv) and insert the following:
-- (iv) a means for mapping an input vector of parameters
(Pl, P2, P3, P4, P5 … $P_i$) onto a subvector
(PN1, PN2, PN3, … $PN_j$), and --

Column 9,
Line 10, after "R5, …", insert -- ) --.

Signed and Sealed this

Twenty-fourth Day of May, 2005

JON W. DUDAS
*Director of the United States Patent and Trademark Office*